United States Patent
Binhussain et al.

(10) Patent No.: US 8,871,019 B2
(45) Date of Patent: Oct. 28, 2014

(54) COMPOSITION FOR CONSTRUCTION MATERIALS MANUFACTURING AND THE METHOD OF ITS PRODUCTION

(75) Inventors: Mohammed A Binhussain, Riyadh (SA); Turki Saud Al-Saud, Riyadh (SA); Siarhei Zhdanok, Minsk (BY); Andrei Krauklis, Minsk (BY); Petr Samtsou, Minsk (BY); Eduard Batsianouski, Minsk (BY)

(73) Assignee: King Abdulaziz City Science and Technology, Riyadh (SA)

( * ) Notice: Subject to any disclaimer, the term of this patent is extended or adjusted under 35 U.S.C. 154(b) by 273 days.

(21) Appl. No.: 13/287,082

(22) Filed: Nov. 1, 2011

(65) Prior Publication Data
US 2013/0104775 A1    May 2, 2013

(51) Int. Cl.
*C04B 14/06* (2006.01)
*C04B 28/04* (2006.01)
*C04B 28/02* (2006.01)
*B82Y 30/00* (2011.01)

(52) U.S. Cl.
CPC ............... *C04B 28/04* (2013.01); *C04B 28/02* (2013.01); *Y10S 977/742* (2013.01); *Y10S 977/773* (2013.01); *B82Y 30/00* (2013.01)
USPC ........... 106/644; 106/717; 977/742; 977/773; 252/502; 977/742

(58) Field of Classification Search
CPC .. C04B 14/022; C04B 14/024; C04B 14/026; C04B 14/06; C04B 14/386; C04B 20/008; C04B 2103/30
USPC ............ 106/717, 644; 977/742, 773; 252/502
See application file for complete search history.

(56) References Cited

U.S. PATENT DOCUMENTS

| | | | |
|---|---|---|---|
| 5,908,584 A * | 6/1999 | Bennett | 252/502 |
| 2007/0172408 A1* | 7/2007 | Takagi | 423/445 R |

* cited by examiner

*Primary Examiner* — Paul Marcantoni
(74) *Attorney, Agent, or Firm* — Raj Abhyanker, P.C.

(57) ABSTRACT

Disclosed is a system or method for efficiently manufacturing construction materials using carbon nanomaterials. In one or more embodiments, the method comprises creating a blend of carbon nanomaterials, wherein the blend of the carbon nanomaterials includes at least one of a carbon nanofiber, a carbon nanotube, a graphite nanoparticle and an amorphous carbon. The method also includes dispersing the carbon nanomaterials and adding a plasticizer and a sand to the dispersed mixture within 3 minutes. The method also includes adding at least one of water and a cement binding agent to the dispersed mixture after the plasticizer and the sand have been added.

7 Claims, 5 Drawing Sheets

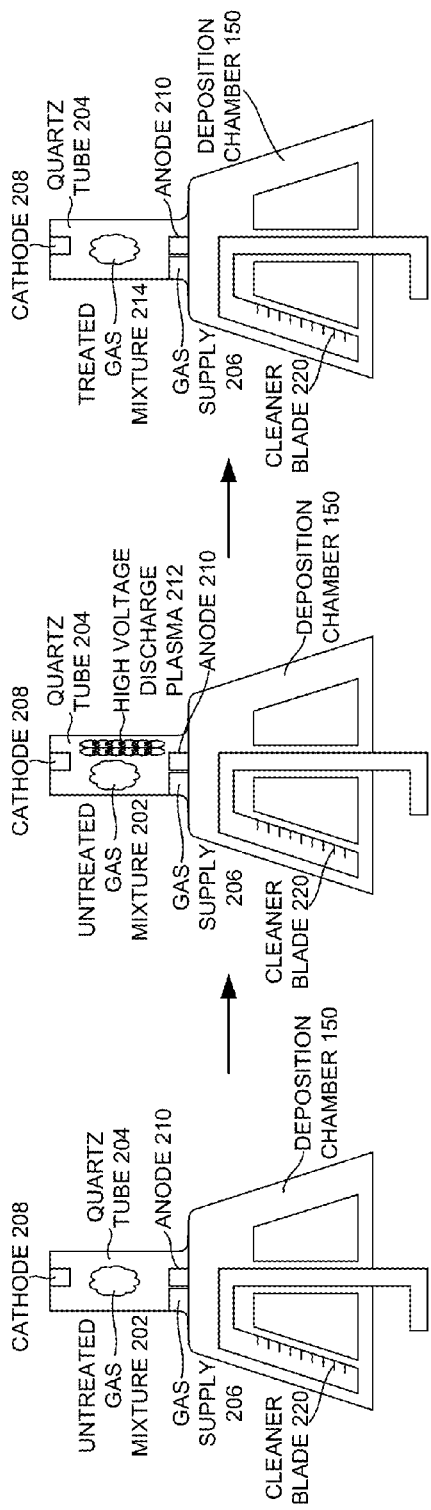
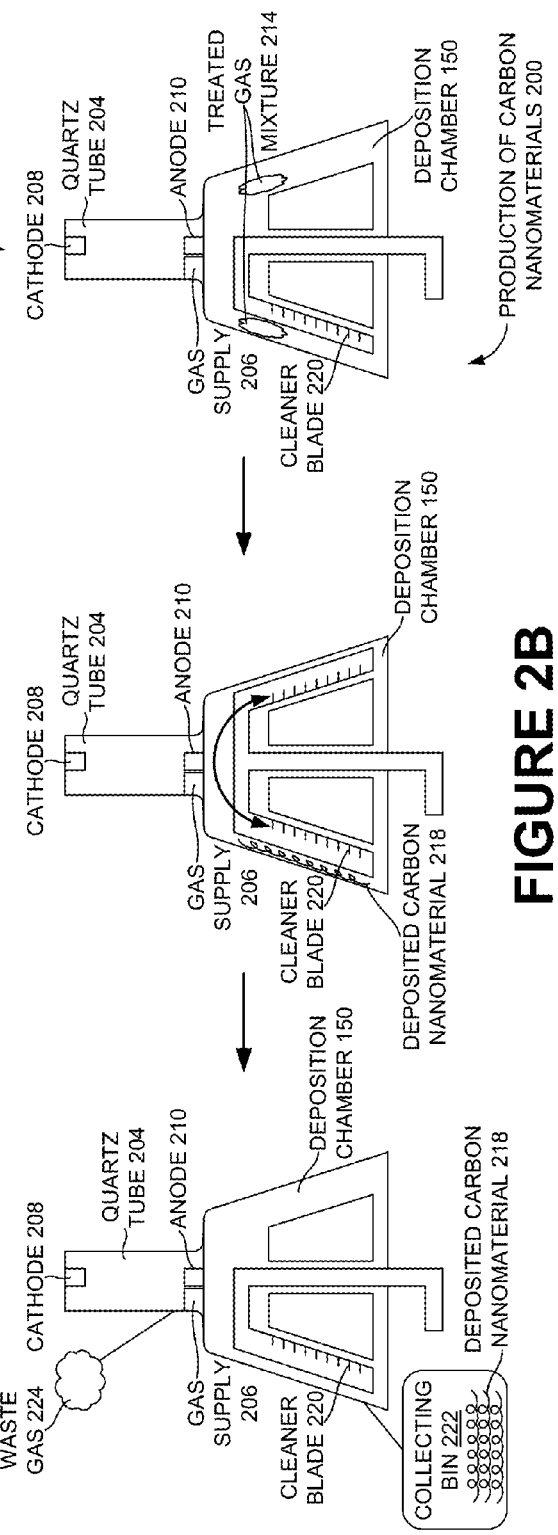
FIGURE 2A
FIGURE 2B

| EXAMPLE | | 1 310 | 2 320 | 3 330 | 4κ 340 | 5 350 | 6 360 |
|---|---|---|---|---|---|---|---|
| COMPOSITION FORMULATION, MASS% 315 | CEMENT | 23 | 23 | 23 | 23 | 23 | 23 |
| | SAND | 68.66 | 68.65 | 68.55 | 68.67 | 68.65 | 68.65 |
| | CARBON NANOMATERIAL 102 | 0.012 | 0.023 | 0.12 | 0 | 0.023 | 0.023 |
| | PLASTICIZER | 0.07 | 0.07 | 0.07 | 0.07 | 0.07 | 0.07 |
| | WATER | 8.26 | 8.26 | 8.26 | 8.26 | 8.26 | 8.26 |
| | DISPERSION TIME (MINUTES) 355 | 3 | 3 | 3 | 3 | 0.5 | 5 |
| TENSILE STRENGTH AT 325 | | 12.8 | 15.6 | 12.1 | 11.9 | 11.2 | 15.5 |
| COMPRESSION STRENGTH, Mpa 345 | | 75.7 | 83.6 | 65.6 | 67.4 | 67.3 | 83.7 |

TABLE 300

COMPOSITION FOR CONSTRUCTION MATERIALS MANUFACTURING AND THE METHOD OF ITS PRODUCTION

FIELD OF TECHNOLOGY

This disclosure relates generally to the technical fields of construction materials manufacturing with carbon nanomaterials and, in one example embodiment, to a system and method of efficiently manufacturing construction materials with carbon nanomaterials.

BACKGROUND

Construction materials may have a wide range of applications. They may have mineral binding agents and can find application in the construction materials industry during the manufacturing of block and cast-in-place concrete, fibrous concrete, polymer cement mortars, dry mortars and concrete mixes, foam concrete, as well as slates, plastering, finishing and protective coatings. Construction materials may require binding agents to improve a set of physical and mechanical characteristics. Construction materials with high tensile strength may have complex chemical compositions and may be difficult to manufacture on a large scale. The chemical composition may be complex and may require a lot of time and may be expensive to manufacture. Construction materials may require high tensile strength, but may be difficult to manufacture in a cost efficient manner. Construction materials having higher tensile strength may employ expensive and complicated compositions and may be difficult to manufacture on a large scale.

SUMMARY

Disclosed are a system and a method of efficiently manufacturing construction materials with carbon nanomaterials. In one or more embodiments a composition to be used in manufacturing construction materials may comprise a cement binding agent, a sand, a plasticizer, a blend of at least one of a carbon nanofiber, a carbon nanotube, a graphite nanoparticle and an amorphous carbon and a water.

In another aspect, a method may comprise creating a blend of at least one of a carbon nanofiber, a carbon nanotube, a graphite nanoparticle and an amorphous carbon. The method further comprises dispersing the blend of the at least one of the carbon nanofiber, the carbon nanotube, the graphite nanoparticle and the amorphous carbon to form a dispersed mixture. The method also comprises adding a plasticizer and a sand to the dispersed mixture within 3 minutes. The method also comprises adding at least one of a water and a cement binding agent to the dispersed mixture after the plasticizer and the sand have been added.

In yet another aspect, the method comprises creating a blend of a carbon nanomaterial. The blend of the carbon nanomaterial may be obtained by treating an untreated gas mixture with a high voltage discharge plasma in a zone between a cathode and an anode to create a treated gas mixture, releasing the treated gas mixture in a deposition chamber through an opening of the anode and collecting the deposited carbon nanomaterial. The method further comprises adding a plasticizer and a sand to the dispersed mixture within 3 minutes. The method also includes adding at least one of a water and a cement binding agent to the dispersed mixture after the plasticizer and the sand have been added.

BRIEF DESCRIPTION OF THE DRAWINGS

Example embodiments are illustrated by way of example and not limitation in the figures of the accompanying drawings, in which like references indicate similar elements and in which:

FIG. 2A is a diagram illustrating a setup for a system and method of automated carbon nanomaterial collection, according to one or more embodiments.

FIG. 2B is a diagram illustrating a setup for a system and method of carbon nanomaterial synthesis with automated collection of a deposited carbon nanomaterial, according to one or more embodiments.

FIG. 3 is a graphical process flow diagram illustrating a method of cleaning a deposited carbon nanomaterial using a plurality of cleaner blades, according to one or more embodiments.

Other features of the present embodiments will be apparent from the accompanying Drawings and from the Detailed Description that follows.

DETAILED DESCRIPTION

Disclosed are a system, a method and/or a composition of increased efficiency in carbon nanomaterial synthesis. It will be appreciated that the various embodiments discussed herein need not necessary belong to the same group of exemplary embodiments; and may be grouped into various other embodiments not explicitly disclosed herein. In the following description, for the purpose of explanation, numerous specific details are set forth in order to provide a thorough understanding of various embodiments.

In one or more embodiments, the use of carbon nanomaterials in the composition of cementitious materials may have multiple applications in the construction industry. The composition may be used to manufacture block and cast-in-place concrete, fibrous concrete, polymer cement mortars, dry mortars, concrete mixes, foam concrete, as well as slates, plastering, finishing and protective coatings.

In one or more embodiments, typical construction materials only consisting of cement, sand and water may possess insufficient strength indices. In one or more embodiments, carbon nanomaterials may be used as an additive in the composition of construction materials to increase the strength of the construction materials. In one or more embodiments, the addition of carbon nanomaterials to the cement may increase a set of physical and mechanical characteristics associated with the construction materials. In one or more embodiments, the use of carbon nanomaterials may also lower a power consumption and cost associated with a production of the construction materials and may also simplify the entire process of producing the construction materials.

Figure 1:
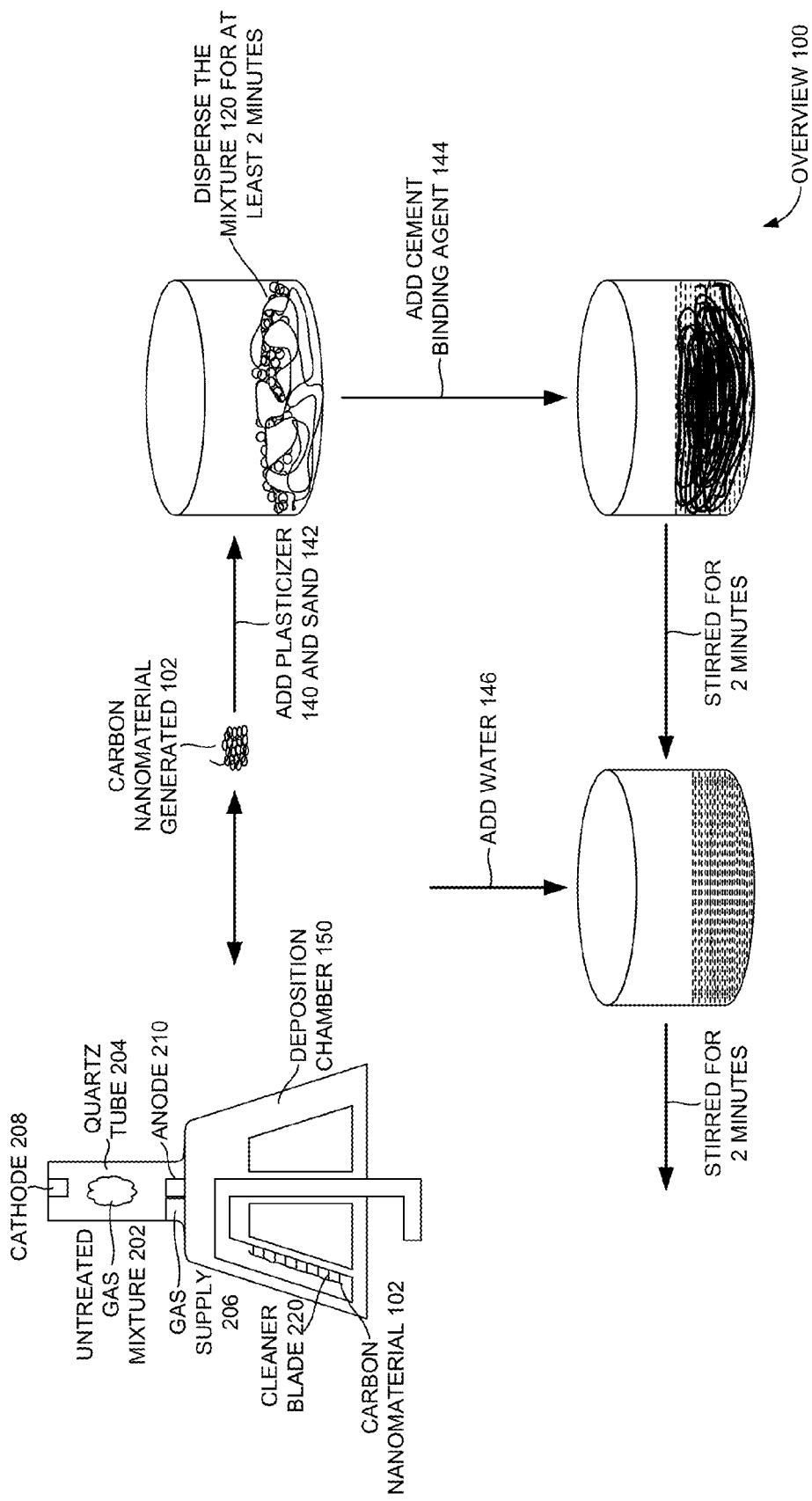
FIG. 1 is a diagram illustrating the steps in the manufacture of the construction materials using carbon nanomaterials.

FIG. 1 is a diagram illustrating the steps in the manufacture of the construction materials using carbon nanomaterials. It depicts the deposition chamber 150, the carbon nanomaterial 102, dispersing the mixture 120, the plasticizer 140, the sand 142, the cement binding agent 144 and the water 146.

In one or more embodiments, the deposition chamber may generate the carbon nanomaterials 102 (FIG. 2). In one or more embodiments, the carbon nanomaterials may be automatically collected from the deposition chamber 150. In one or more embodiments, the carbon nanomaterials may be a blend of at least one of a carbon nanofiber, a carbon nanotube, a graphite nanoparticle and an amorphous carbon. As illustrated in FIG. 1, the carbon nanomaterial, which may be a blend of at least one of a carbon nanofiber, a carbon nanotube, a graphite nanoparticle and an amorphous carbon, may be collected from a deposition chamber 150. FIG. 2 illustrates the process of producing the carbon nanomaterials with the use of the deposition chamber 150.

In one or more embodiments, the carbon nanomaterials may be dispersed to form a dispersed mixture 110. In one or more embodiments, the carbon nanomaterials are generated during gaseous hydrocarbons decomposition in atmospheric-pressure high voltage plasma as discussed below. In one or more embodiments, using the carbon nanomaterials may allow dispersing by first simultaneously stiffing the sand and the plasticizer in a carbon nanomaterials stirrer. This may be done without using complex and expensive equipment like an ultrasonic disperser. During such mixing, sand particles making fragmentation of sintered carbon nanomaterials into smaller particles, thereby distributing them at the same time into the sand mixture, in one or more embodiments. In one or more embodiments, dispersion refers to decomposing the carbon nanomaterials into smaller particles. In one or more embodiments, the carbon nanomaterials may be dispersed using an ultrasonic disperser. In one or more embodiments, the plasticizer and sand may be introduced into the mixture and may be stirred for at least 3 minutes. After the dispersed mixture has been stirred in with the plasticizer and the sand, the cement binding agent is added to the mixture and stirred for at least 2 minutes. The water is then added to the new mixture with the cement binding agent and then stirred for another additional 2 minutes.

FIG. 2 is a graphical process flow diagram illustrating a method for the automated collection of the carbon nanomaterial. It illustrates the cathode 208, the untreated gas mixture 202, the quartz tube 204, the anode 210, the gas supply 206, the cleaner blade 220, the deposition chamber 150, the high voltage discharge plasma 212, the treated gas mixture 214, the waste gas 224, the deposited carbon nanomaterial 218 and the collecting bin 222.

In one or more embodiments, the presence of an untreated gas mixture 202 may be detected when the untreated gas mixture 202 is fed into a quartz tube 204 through a gas supply 206. The quartz tube 204 may comprise a cathode 208 and an anode 210 in one or more embodiments. In one or more embodiments, the untreated gas mixture 202 may be treated by a high-voltage discharge plasma 212 in the quartz tube 204 in the zone between the cathode and the anode 210 to create a treated gas mixture 214.

In one or more embodiments, the treated gas mixture 214 may be released in a deposition chamber 216 through an opening of the anode 210. A deposited carbon nanomaterial 218 may be deposited in the deposition chamber 216 in one or more embodiments. In one or more embodiments, the deposited carbon nanomaterial 218 may be a multi-walled or single walled carbon nanotube, a carbon nanofiber or a nanographite particle. In one or more embodiments, the carbon nanofiber may be a cylindrical structure with graphene layers stacked as cones, cups or plates. Graphene is an allotrope of carbon and stacked sheets of graphene may form graphite.

In one or more embodiments, carbon nanofibers that are perfect cylinders may be called carbon nanotubes. In one or more embodiments, carbon nanomaterials may exhibit extraordinary strength and unique electrical properties and may be good thermal conductors. In one or more embodiments, multi-walled carbon nanotubes may comprise multiple layers, such as concentric rolled cylinders of graphite. In one or more embodiments single walled carbon nanotubes comprise just a single layer of graphene. In one or more embodiments, a single wall carbon nanotube may be one nanometers in diameter but hundreds (or even millions) of nanometers in length.

In one or more embodiments, carbon nanotubes are one of the strongest materials known in terms of tensile strength. In one or more embodiments, tensile strength is a measure of stress a material can withstand while being pulled or stretched apart. In one or more embodiments, the carbon nanotubes may also be the stiffest materials known in terms of elastic modulus. In one or more embodiments, the elastic modulus is a description of a material's tendency to deform elastically or non-permanently, when a force is applied to it. Young's modulus may describe a form of elasticity known as tensile elasticity, also known as an object's tendency to deform along an axis when opposing forces are applied along that axis. In one or more embodiments, carbon nanotubes may have a Young's modulus that is about 5 times greater than that of steel. In one or more embodiments, carbon nanotubes may also be very lightweight and may have high thermal conductivity.

In one or more embodiments, the deposited carbon nanomaterial 218 may be used to develop polymer nanocomposites. In one or more embodiments, the nanocomposite may be a multiphase material wherein one phase has a dimension of less than 100 nanometers. A polymer nanocomposite may be a polymer or copolymer having dispersed in its nanoparticles in one or more embodiments. In one or more embodiments, polymer nanocomposites may be strong and may have unique thermal and electrical properties.

In one or more embodiments, the deposited carbon nanomaterial 218 may be cleaned using a plurality of cleaner blades 220. In one or more embodiments, the deposited carbon nanomaterial 218 may be sent to a collecting bin 222 coupled to the deposition chamber 150. In one or more embodiments, a waste gas 224 may also be released.

FIG. 3 depicts a table illustrating various experiments and quantities of the composition for the construction material. FIG. 3 depicts six experiments (310, 320, 330, 340, 350 AND 360) that used varying quantities in mass percent 315 of the cement binding agent, the sand, the carbon nanomaterial, the plasticizer and the water. It also shows the dispersion time 355 of the mixture, the tensile strength as tested 325, the bending MPa 335 and compression strength in MPa 345.

In the first experiment 310, 5 kg of Portland cement binding agent was used as a cementitious agent and 15 kg of fine aggregate in the form of quartz sand was used. The cement binding agent comprised 23% in mass and the sand comprised 68.66% in mass. First, 0.0025 kg (0.012 mass percent) of the carbon nanomaterial was used and dispersed. 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 12.8 and the compression strength was 75.7.

In the second experiment 320, 5 kg of Portland cement binding agent was used as a cementitious agent and 15 kg of fine aggregate in the form of quartz sand was used. The cement binding agent comprised 23% in mass and the sand comprised 68.66% in mass. First, 0.005 kg (0.023 mass percent) of the carbon nanomaterial was used and dispersed. 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 15.6 and the compression strength was 83.6.

In the third experiment 330, 5 kg of Portland cement binding agent was used as a cementitious agent and 15 kg of fine aggregate in the form of quartz sand was used. The cement binding agent comprised 23% in mass and the sand comprised 68.66% in mass. First, 0.025 kg (0.12 mass percent) of the carbon nanomaterial was used and dispersed. 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 12.1 and the compression strength was 65.6.

In the fourth experiment 340, 5 kg of Portland cement binding agent was used as a cementitious agent and 15 kg of fine aggregate in the form of quartz sand was used. The cement binding agent comprised 23% in mass and the sand comprised 68.66% in mass. First, 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 11.9 and the compression strength was 67.4.

In the fifth experiment 350, 5 kg of Portland cement binding agent was used as a cementitious agent and 15 kg of fine aggregate in the form of quartz sand was used. The cement binding agent comprised 23% in mass and the sand comprised 68.66% in mass. First, 0.005 kg (0.023 mass percent) was used and dispersed. 0.015 kg (0.07 mass percent) of plasticizer Sica Viscocrete was added to the sand and dispersed into the mixer within 0.5 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 11.2 and the compression strength was 67.3.

In the sixth experiment 360, 5 kg of Portland cement binding agent was used as a cementitious agent and 15 kg of fine aggregate in the form of quartz sand was used. The cement binding agent comprised 23% in mass and the sand comprised 68.66% in mass. First 0.005 kg (0.023 mass percent) of carbon nanomaterial was used and dispersed. 0.015 kg (0.07 mass percent) of plasticizer Sica Viscocrete was added to the sand and dispersed into the mixer within 5 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 15.5 and the compression strength was 83.7

In one or more embodiments, adding the carbon nanomaterial increased tensile strength at bending by 31% and compression strength by 24%.

Figure 4:
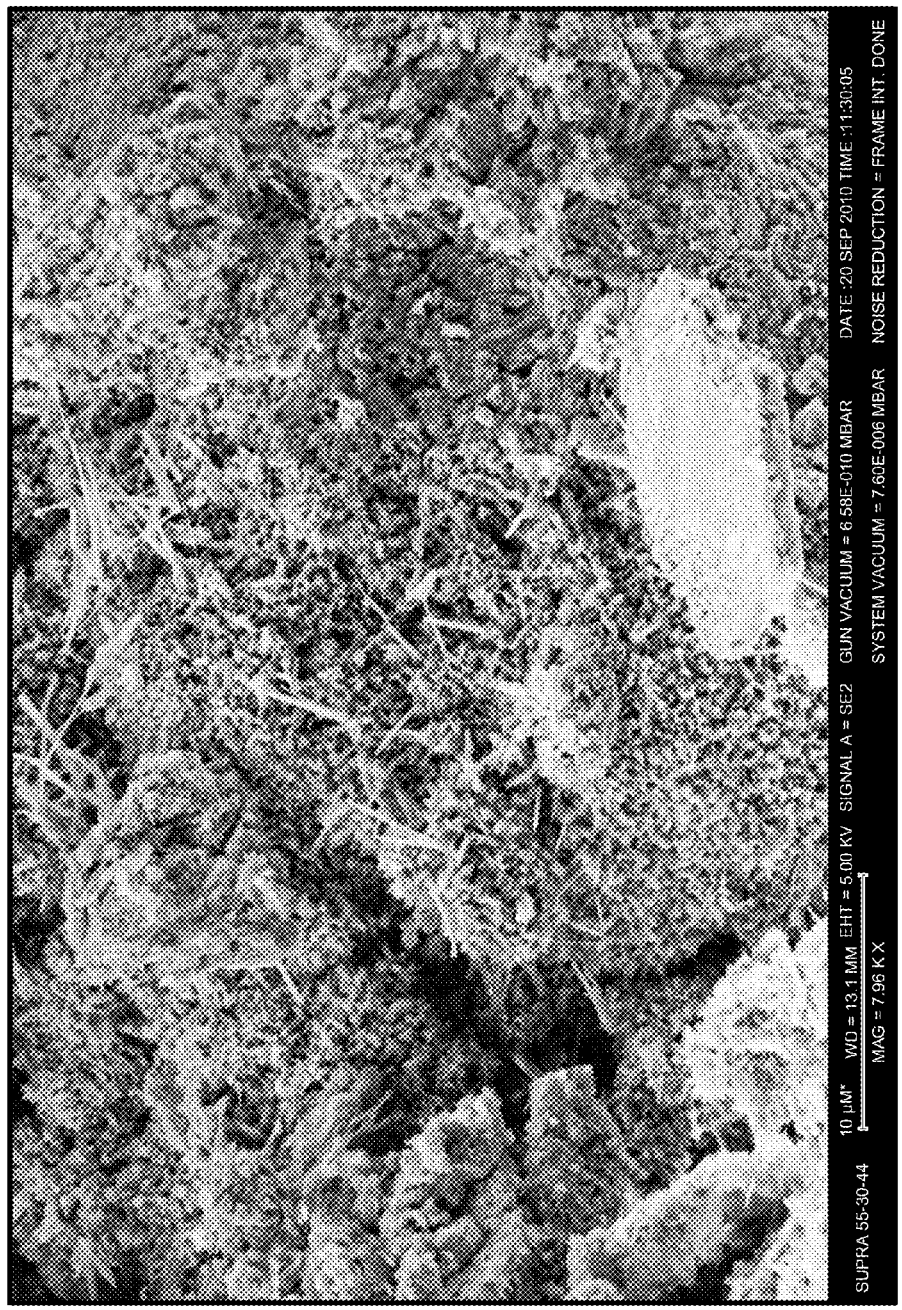
FIG. 4 is a process flow diagram illustrating a method of increasing efficiency in carbon nanomaterial synthesis, according to one or more embodiments.

FIG. 4 shows an electron microscopic structure of the concrete with carbon nanomaterials.

Figure 5:
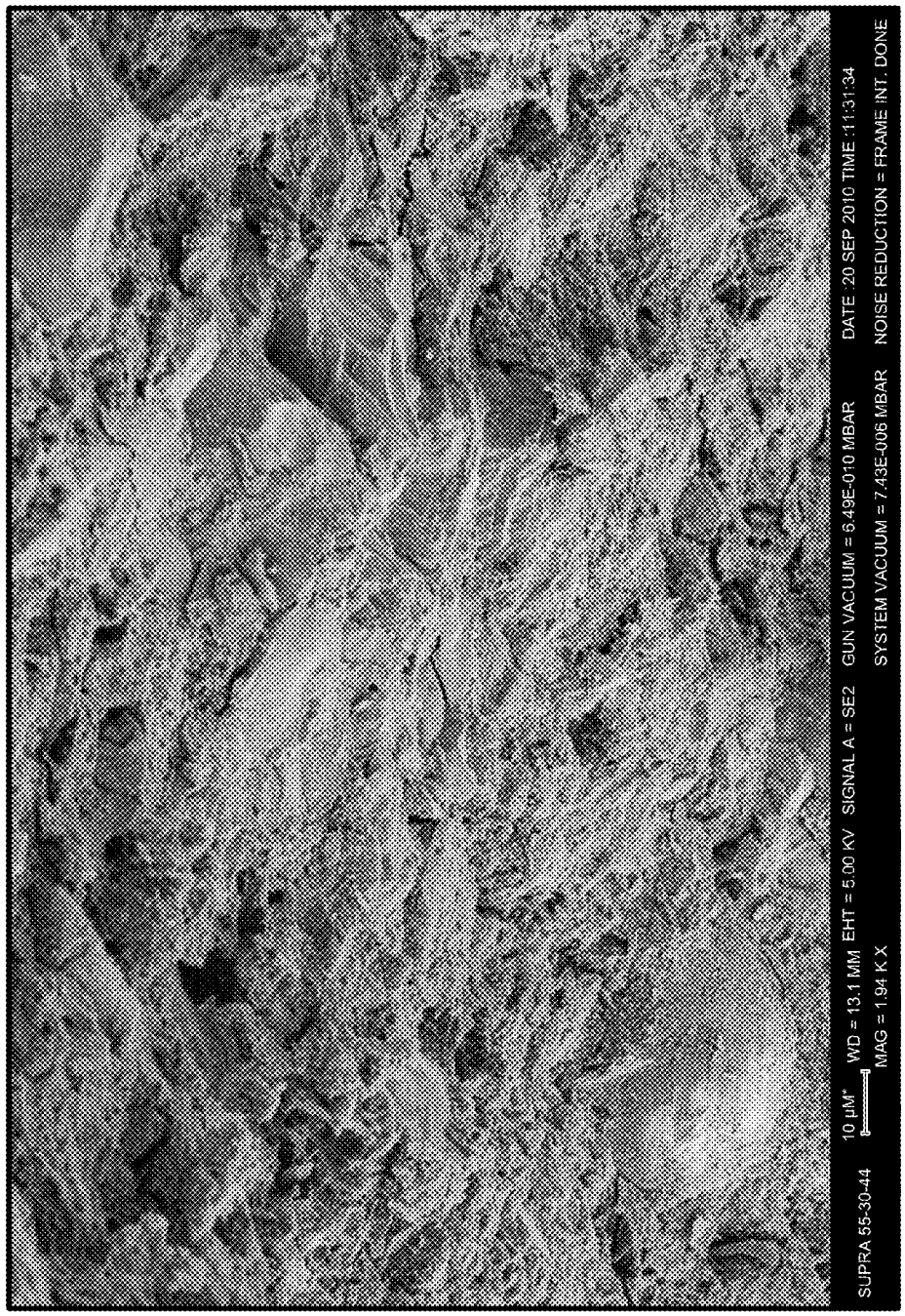
FIG. 5 is a process flow diagram illustrating another method of efficient carbon nanomaterial synthesis, according to one or more embodiments.

FIG. 5 shows an electron microscopic structure of the concrete without carbon nanomaterials.

Although the present embodiments have been described with reference to specific example embodiments, it will be evident that various modification and changes may be made to these embodiments without departing from the broader spirit and scope of the various embodiments. Accordingly, the specification and drawings are to be regarded in an illustrative rather than a restrictive sense.

What is claimed is:

1. A composition to be used in manufacturing construction materials comprising:
   15-55% by mass percentage of a cement binding agent;
   5-50% by mass percentage of sand;
   0.05-1% by mass percentage of a plasticizer;
   a 0.0125% to 1% by mass percentage blend of carbon nanomaterials, wherein the blend of the carbon nanomaterials includes carbon nanofibers, carbon nanotubes, graphite nanoparticles and amorphous carbon; and
   a remaining mass percentage of water.

2. The composition of claim 1, wherein a mass percentage of the carbon nanofibers within the blend of carbon nanomaterials ranges from 20-40%.

3. The composition of claim 1, wherein a mass percentage of the carbon nanotubes within the blend of carbon nanomaterials ranges from 20-30%.

4. The composition of claim 1, wherein a mass percentage of the graphite nanoparticles within the blend of carbon nanomaterials ranges from 2-5%.

5. The composition of claim 1, wherein:
   the blend of carbon nanomaterials is stirred with the sand and the plasticizer for no more than 3 minutes to form a mixture.

6. The composition of claim 5, wherein the mixture is added to the cement binding no more than 2 minutes after formation thereof.

7. The composition of claim 1, wherein the blend of carbon nanomaterials is obtained through:
   detecting presence of an untreated gas mixture when the untreated gas mixture is fed in a quartz tube through a gas supply,
   treating the untreated gas mixture with high-voltage discharge plasma in a zone between a cathode and an anode to create a treated gas mixture,
   releasing the treated gas mixture in a deposition chamber through an opening of the anode, and
   collecting a deposited carbon nanomaterial used in the blend of carbon nanomaterials automatically with a plurality of cleaner blades.

* * * * *